United States Patent [19]

Tew et al.

[11] 4,405,230
[45] Sep. 20, 1983

[54] HETERODYNE LASER RANGING SYSTEM

[75] Inventors: Claude E. Tew, Dallas; Fred E. Ellis, Plano, both of Tex.

[73] Assignee: Texas Instruments Incorporated, Dallas, Tex.

[21] Appl. No.: 267,940

[22] Filed: May 28, 1981

[51] Int. Cl.³ .............................. G01C 3/08; H01S 3/00
[52] U.S. Cl. ........................................ 356/5; 356/28.5; 372/18; 372/32; 372/71
[58] Field of Search ................... 356/5, 28.5; 372/18, 372/32, 71

[56] References Cited

U.S. PATENT DOCUMENTS

| | | | |
|---|---|---|---|
| 3,409,369 | 11/1968 | Bickel | 356/28.5 |
| 3,511,569 | 5/1970 | Mackta | 356/28.5 |
| 3,636,474 | 1/1972 | DeMaria et al. | 372/18 |
| 3,652,161 | 3/1972 | Ross | 356/5 |
| 3,810,042 | 5/1974 | Chang et al. | 372/18 |
| 3,841,755 | 10/1974 | Debart | 356/5 |
| 4,019,157 | 4/1977 | Hutchinson et al. | 372/71 |

OTHER PUBLICATIONS

Alcock et al., Applied Physics Letters, vol. 30, No. 3, pp. 148-150, 2/1/77.
Cole, J. of Physics D, vol. 18, No. 12, pp. 1392-1408, 8/21/75.

Primary Examiner—S. C. Buczinski
Attorney, Agent, or Firm—Alva H. Bandy; Rhys N. Merrett; Melvin Sharp

[57] ABSTRACT

A heterodyne laser ranging system is disclosed which provides a waveguide housing which includes a first and second gas laser. The first laser is a low pressure laser while the second laser is a high pressure laser. These two lasers formed in the waveguide housing have their longitudinal axis in optical alignment. In the preferred embodiment, the second high pressure gas laser is a transversely excited atmospheric (TEA) laser. The first low pressure gas laser produces two outputs, one of the outputs is a low level local oscillator signal while the second output is transmitted as an input to the high pressure laser. The second high pressure laser builds up from the injected signal from the low pressure laser which results in a high pressure laser pulse output that has the frequency stability of the low pressure laser while maintaining the high peak power output available from a transversely pumped waveguide laser. The exitation of the low pressure laser continues throughout the length of time necessary to receive reflected energy from a target. The reflected energy from the target as well as the local oscillator output from the low pressure laser impinges on a detector which is utilized for heterodyne detection.

6 Claims, 7 Drawing Figures

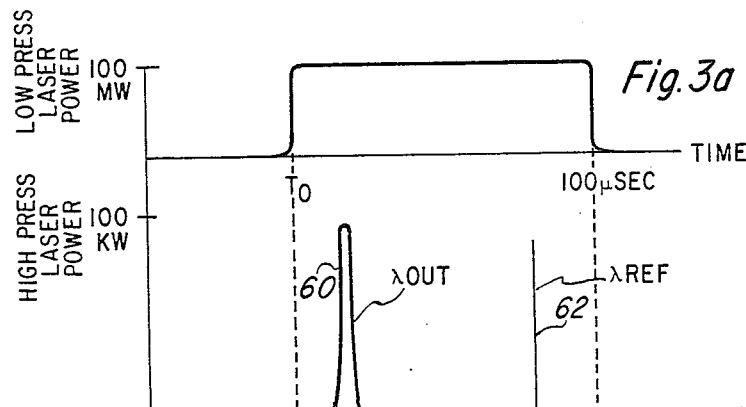
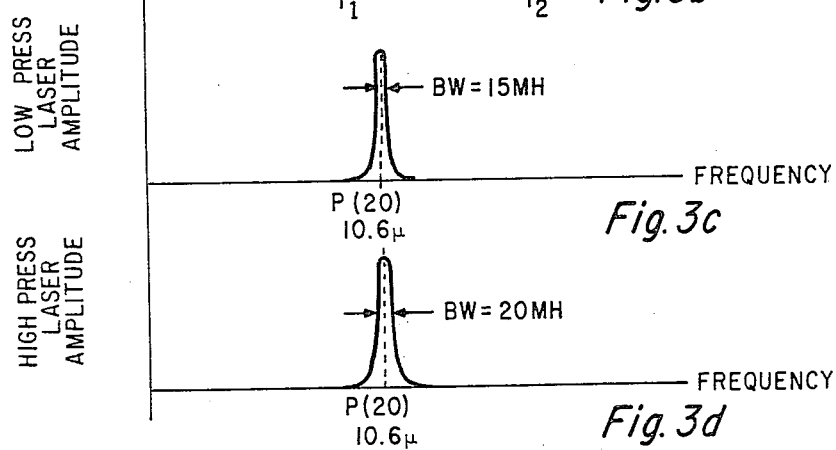
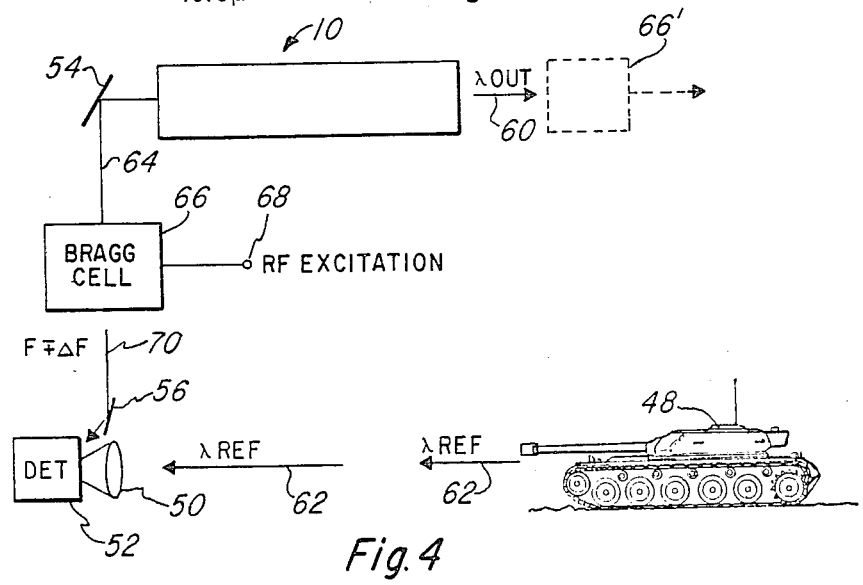

HETERODYNE LASER HANGING SYSTEM

This invention relates to lasers and more particularly to an arrangement for producing a frequency stabilized laser system capable of heterodyne operation.

Heterodyne detection of reflected laser pulses has significant signal to noise ratio advantages over direct detection. One of the problems involved with heterodyne detection is obtaining a laser transmitter optical pulse that has spectral purity and adequate peak power. An additional problem with heterodyne detection range finding is that the system requires a local oscillator signal. This local oscillator signal has to provide a known stable frequency source of radiation that can be heterodyne with the reflected received signal from the laser.

Frequency stabilizing laser pulses has been discussed in a number of references. U.S. Pat. No. 3,921,099, for example, discloses a frequency stabilized laser using a Stark-effect cell in a feedback loop which produces an error signal back to the laser to control the laser oscillation frequency so as to minimize the error signal and thereby stabilize the laser at the desired oscillation frequency.

An article by W. Michael Lipchak entitled "Improved Frequency Stability of the TEA $CO_2$ Laser" In *Optics Communications,* dated November 1976, Volume 19, No. 2, pages 205-207 discloses a free space TEA laser that is frequency stabilized by use of a grating and a closed loop piezoelectric longitudinal control. The size of the system described by Lipchick is one of its disadvantages and its alignment is very critical. No local oscillator output is available.

Another article by A. Gondhalekar et al entitled "The Mechanism of Single-Frequency Operation of the Hybrid-$CO_2$ Laser" in the I.E.E.E. Journal of *Quantum Electronics,* Volume QE-11, No. 3, March 1975, pages 103-108 describes the use of low level excitation of a free space TEA-$CO_2$ laser by a low pressure frequency stable free space laser to produce frequency stable pulses. This system also has appreciable size; the laser cavity length is 210 centimeters. This system does provide frequency stable pulses but its size and lack of local oscillator output make it inappropriate for a heterodyne laser ranging system.

Accordingly, it is an object of the present invention to provide a compound laser heterodyne ranging system.

Another object is to provide a low pressure/high pressure waveguide laser which produces both a high power, frequency stable, low bandwidth output pulse as well as a local oscillator output pulse.

Another object of the present invention is to produce a laser ranging system requiring reduced power levels for the equivalent range.

Another object of the present invention is to provide a compound laser ranging system which is both compact, simple, reliable and relatively inexpensive.

Another object of the present invention is to provide a low pressure/high pressure laser system contained in a single unified structure which is easy to fabricate and provides inherent alignment of the two lasers.

Another object of the present invention is to provide a heterodyne low pressure/high pressure laser ranging system which will maintain its ranging accuracy even with frequency shifts in the local oscillator-low power laser.

Another object of the present invention is to produce a laser ranging system with reduced peak power requirements.

Other objects and features of the invention will become more readily understood from the following detailed description and appended claims read in conjunction with the accompanying drawings, in which like reference numerals designate like parts throughout the figures thereof, and in which:

FIGS. 3a-3d are waveforms illustrating the operation of the laser system.

FIG. 4 illustrates an alternate embodiment of the laser system incorporating heterodyne detection.

Figure 1:
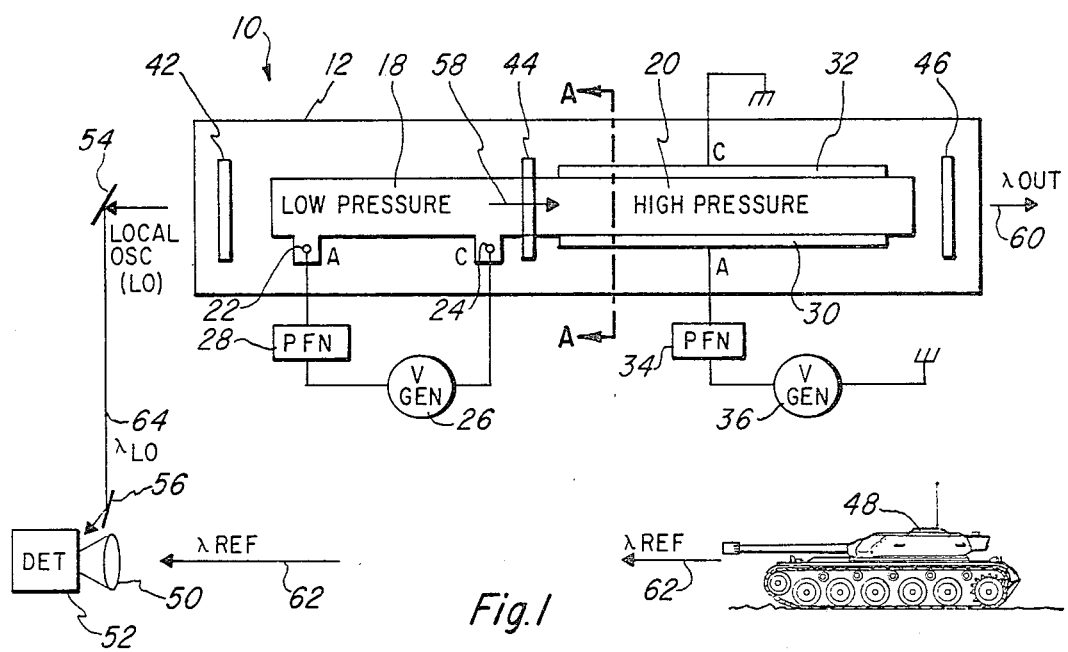
FIG. 1 is a block diagram of laser system constructed according to the present invention.
Figure 2:
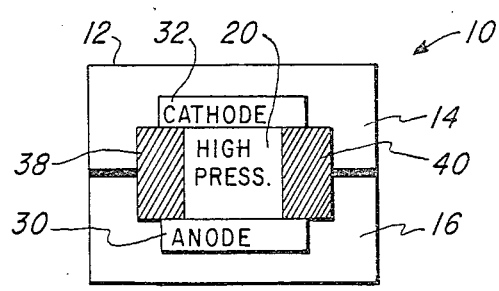
FIG. 2 is a cross-sectional view of lines A—A of FIG. 1 of the laser system constructed according to the present invention.

Referring now to FIGS. 1 and 2, there is illustrated a laser ranging system 10 illustrated according to the present invention. Laser system 10 is comprised of a laser waveguide housing 12 which is composed of an upper section 14 and a lower section 16 (FIG. 2). Waveguide housing 12 is made from a ceramic material such as Boron Nitride (BN), Maycor ceramic (manufactured and sold by Dow Chemical Company), Alumina ($Al_2O_3$) Beryllia (BeO) or other suitable material. Waveguide housing 12 includes two lasers, a low pressure laser 18 and a high pressure laser 20. These two lasers are, in the preferred embodiment, gas lasers such as $CO_2$ lasers. A waveguide laser such as is described herein has the advantage of being compact in size which allows smaller electrode spacing which, in turn, also allows the gas pressure therein to be increased. This in effect gives more output power per cubic inch of waveguide housing package. The waveguide housing 12 allows closer alignment tolerances to be maintained between low pressure laser 18 and high pressure laser 20 while the ceramic material from which is it constructed results in an inherently temperature stable system. In the preferred embodiment, the waveguide housing 12 is of a rectangular configuration which allows linear polarization and ease of manufacture.

Low pressure laser 18 is a long pulse width, low level oscillator. The length of this waveguide will be short compared to the length of high pressure laser 20. Low pressure laser 18 is illustrated as being longitudinally pumped by anode (A) 22 and cathoe (C) 24. Low pressure laser 18 could be transversely pumped. Voltage generator 26 and pulse forming network 28 provide the current necessary to cause low pressure laser 18 to lase. Typically, voltage generator 26 generates a DC voltage and pulse forming network 28 is comprised of an LC circuit which stores the energy of the voltage generator 26. When the capacitor discharges, the inductor tailors the shape of the discharge current pulse to cause laser 18 to lase. Such circuits are generally known in the art and will not be described further herein. Typically, low pressure laser 18 is a low gain system which requires a buildup time of several microseconds.

High pressure laser 20 is a transversely pumped gas laser and has the advantage of a buildup time in the hundreds of nanoseconds and also has the potential for high peak powers. This is particularly desirable in laser ranging or radar systems. Typically, the pressure of the gas in the high pressure laser will by 760 torr (one atmosphere); the pressure in the low pressure laser 18 is approximately 15 torr. The high pressure laser 20 is transversely pumped by anode (A) 30 and cathode (C) 32. The cathode 32 is grounded. The anode 30 is connected to a pulse forming network 34 and voltage generator circuit 36 which in turn is grounded. Pulse forming network 34 and voltage generator 36 operate in a conventional manner (similar to pulse forming network 28 and voltage generator 26) and will not be described herein. Spacers 38 and 40 (FIG. 2) form the vertical walls of the high pressure laser 20.

Laser system 10 also includes three reflectors. Reflector 42 on the output side of low pressure laser 18 is approximately 99% reflective, i.e., only 1% of the low pressure laser 18 is transmitted therethrough. Reflector 44, which is optically located between low pressure laser 18 and high pressure laser 20, is highly reflective on both sides, for example 98% reflective. Reflector 46, on the output side of high pressure laser 20, is approximately 50% reflective, thereby allowing a high power transversely excited laser pulse 60 ($\lambda_{out}$) to exit from laser system 10. The high power output signal or pulse from laser system 10 will impinge upon a target 48 and a reflected representation 62 ($\lambda_{ref}$) of said output signal will be directed therefrom. This reflected signal 62 will be transmitted through focusing lens 50 onto detector 52. The output signal from low pressure laser 18 is a local oscillator signal 64 ($\lambda_{LO}$) and is reflected off of folding mirrors 54 and 56 through focusing lens 50 onto detector 52. Detector 52 may be a single detector such as a photovoltaic diode.

FIGS. 3a-3d illustrate various waveforms during the operation of the laser system 10. Initially, low pressure laser 18 is excited by voltage generator circuit 26 and pulse forming network 28 which longitudinally pumps laser 18 through anode 22 and cathode 24. Laser 18 produces a constant, low power output (for example, 100 milliwatts) for a predetermined time period (for example, 100 microseconds) as shown in FIG. 3a. The low pressure laser produces a stable frequency output which can be designed to operate on the P(20) 10.6 micron laser transition (see FIG. 3c). The low pressure laser is pulsed on at time $t_0$, FIG. 3a, prior to the excitation of high pressure laser 20; this allows the turn on transients of the low pressure laser to settle. A small amount (approximately 2%) of output signal from low pressure laser 18 is allowed to pass through reflector 44 into high pressure laser 20. When the low pressure laser 18 has stabilized, the high pressure laser 20 is excited by voltage generator 36 and pulse forming network 34 which transversely pumps laser 20 through anode 30 and cathode 32. The outpt signal from laser 18 is transmitted along longitudinal axis 58 to laser 20. Since the excitation of laser 20 is dominated by the low pressure signal excitation from laser 18 along axis 58 (and not spontaneous emission), the high pressure laser 20 locks onto the frequency P(20), (10.6 microns) of the low pressure laser 18. This results in an output pulse 60 at time $t_1$ (FIG. 3b) that has the frequency stability of the low pressure laser 18 while producing a high peak power output signal 60 (for example, 100 kilowatts) available from a transversely pumped waveguide laser. It will be noted from FIGS. 3a and 3b that the excitation of the low pressure laser 18 continues throughout the length of time necessary to receive the reflected transmitted signal 62 (from time $t_o$ for 100 microseconds), i.e., the time necessary for at least the round trip time for the high pressure signal 60 to hit target 48 (FIG. 1) and be reflected back to detector 52 (from time $t_1$ to $t_2$). In FIG. 3b, the reflected signal 62 occurs 66.7 microseconds after it is transmitted which means that the target 48 is 10,000 meters in range from the laser system transmitter 10. It will be noted that the transmitted signal 60 in FIG. 3b and received or reflected signal 62 occurs within the time envelope ($t_o$ to 100 microseconds) of the low pressure laser 18 waveform in FIG. 3a. It should also be noted that a portion of the low pressure laser signal is transmitted through reflector 42 (FIG. 1) and forms a local oscillator signal 64 ($l_o$) which is transmitted through focusing lens 50 upon detector 52 and is used as a local oscillator signal for homodyne or heterodyne detection. The embodiment shown in FIG. 1 illustrates a homodyne detection system (namely when the local oscillator signal 64 is the same frequency as the reflected signal 62).

FIG. 3c illustrates that the low pressure laser is stabilized onto the P(20) 10.6 micron line with a bandwidth of 15 megahertz, for example. High pressure laser 20, as illustrated in FIG. 3d, locks onto the P(20) 10.6 micron line also. Because of this frequency injection by low pressure laser 18 into high pressure laser 20, the bandwidth of high pressure laser 20, as illustrated in FIG. 3d, is in the megahertz range (for example, 20 megahertz) instead of the gigahertz range. This is one of the decided advantages of this system without which good heterodyne detection could not be achieved.

FIG. 4 illustrates another embodiment of the present invention in which heterodyne detection is shown (namely when the local oscillator frequency signal 64 is varied relative to the reflected signal 62 from the target 48. In this embodiment, a Bragg cell 66 is optically inserted in the path of local oscillator signal 64. Bragg cell 66 has a RF excitation signal inserted on terminal 68 to cause the output signal 70 therefrom to vary in frequency from the input signal by an amount equal to $\Delta f$. This local oscillator signal 70 of frequency $f \pm \Delta f$ is then transmitted through focusing lens 50 onto detector 52. The reflected signal 62 of frequency f is also radiated onto detector 52 for heterodyne detection. Although the Bragg cell is shown as located on the low pressure laser side of system 10, it should be recognized that Bragg cell 66 could be optically placed such that the high power laser output signal 60 forms the Bragg cell input as shown by the dotted representation in FIG. 4 of Bragg cell 66'. This would accomplish the same type of heterodyne operation. For purposes of this invention, since homodyne operation is a special case of heterodyne operation, it will be understood that wherever heterodyne operation is mentioned it is meant to include both homodyne as well as heterodyne operation. Additionally, although FIG. 1 illustrates the two lasers 18 and 20 as being in line, it will be recognized that alternatively, they could be placed one on top of the other with two folding mirrors used (or the equivalent) to direct the output of the low pressure laser 18 into the high pressure laser 20.

Although the present invention has been shown and illustrated in terms of a specific apparatus, it will be apparent that changes or modifications can be made without departing from the spirit and scope as defined by the appended claims.

We claim:

1. A heterodyne laser ranging system comprising a waveguide housing formed of a material suitable for providing an inherently temperature stable system, said waveguide housing having first and second lasers and first, second, and third reflectors selectively mounted therein in substantially optical alignment, said first laser including electrode means including first and second electrodes for producing a low level signal for a preselected time period at a selected frequency, said first reflector operatively positioned as to the first laser to reflect a first portion of the first laser output back through the laser while passing a second portion as a low level local oscillator signal ($f_{ref}$), said second reflector operatively positioned between said first and second lasers and having a first reflecting surface for reflecting a first portion of the first laser energy back through the first laser while passing a second portion into the second laser as a low level stable frequency signal substantially equal to the frequency of the local oscillator signal and a second reflecting surface for reflecting the laser energy of the second laser back through the second laser, said second laser having electrode means including first and second transversely spaced electrodes operative in response to the low level stable frequency signal of the first laser for producing a high level signal at substantially the same frequency ($f_{ref}$), as that of the local oscillator signal, and said third reflector for reflecting a first portion of the second laser energy impinging thereon while passing a second portion as a high power output pulse at the same frequency as the low level local oscillator, whereby said first and second lasers have substantially close optical alignment tolerances and electrode spacing thereby providing substantially increased output power per cubic inch of waveguide housing, and detector means for detecting said local oscillator signal ($f_{ref}$) and any laser return of the high power output pulse including a doppler shifted return pulse ($f_r$) for mixing sid $f_{ref}$ and $f_r$ signals and generating desired ranging information.

2. A heterodyne laser ranging system according to claim 1 wherein the second laser further includes a pair of spacer members, said pair of spacer members co-acting with said first and second transversely spaced electrodes to form the second laser.

3. A heterodyne laser ranging system according to claim 1 wherein said first reflector is about 99% reflective, said first and second reflective sides of said second reflector are about 98% reflective and said third reflector is about 50% reflective.

4. A heterodyne laser ranging system according to claim 1 wherein said first laser is a $CO_2$ laser having a pressure of about 15 TOR and said second laser is a $CO_2$ laser having a pressure of about 760 TOR.

5. A heterodyne laser ranging system according to claim 4 wherein the first $CO_2$ laser is longitudinally pumped by the electrodes and the second $CO_2$ laser is transversely pumped by the electrodes to provide a high power transversely excited laser pulse.

6. A heterodyne laser ranging system according to claim 4 wherein the first laser provides a P(20) about 10.6 microns signal to the second laser which locks onto the signal to provide pulses having about 100 kilowatts power at 10.6 microns.

* * * * *